Aug. 26, 1930.   L. C. HESTER   1,774,007
AGRICULTURAL MACHINE
Filed Sept. 22, 1927   2 Sheets-Sheet 1
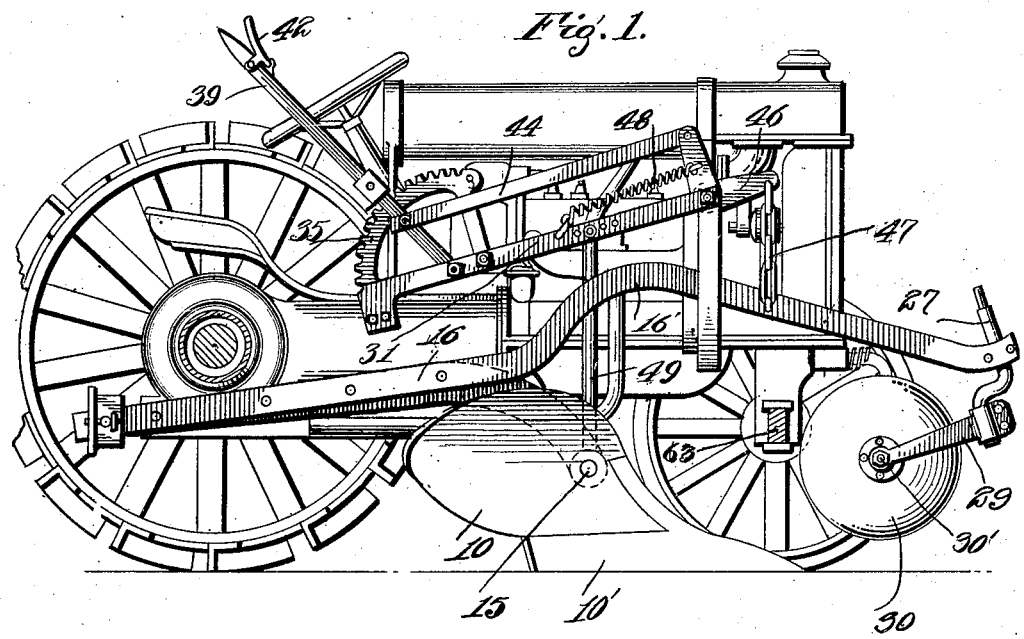
INVENTOR
Levi C. Hester.
BY
Munn & Co.
ATTORNEY Aug. 26, 1930.    L. C. HESTER    1,774,007
AGRICULTURAL MACHINE
Filed Sept. 22, 1927    2 Sheets-Sheet 2
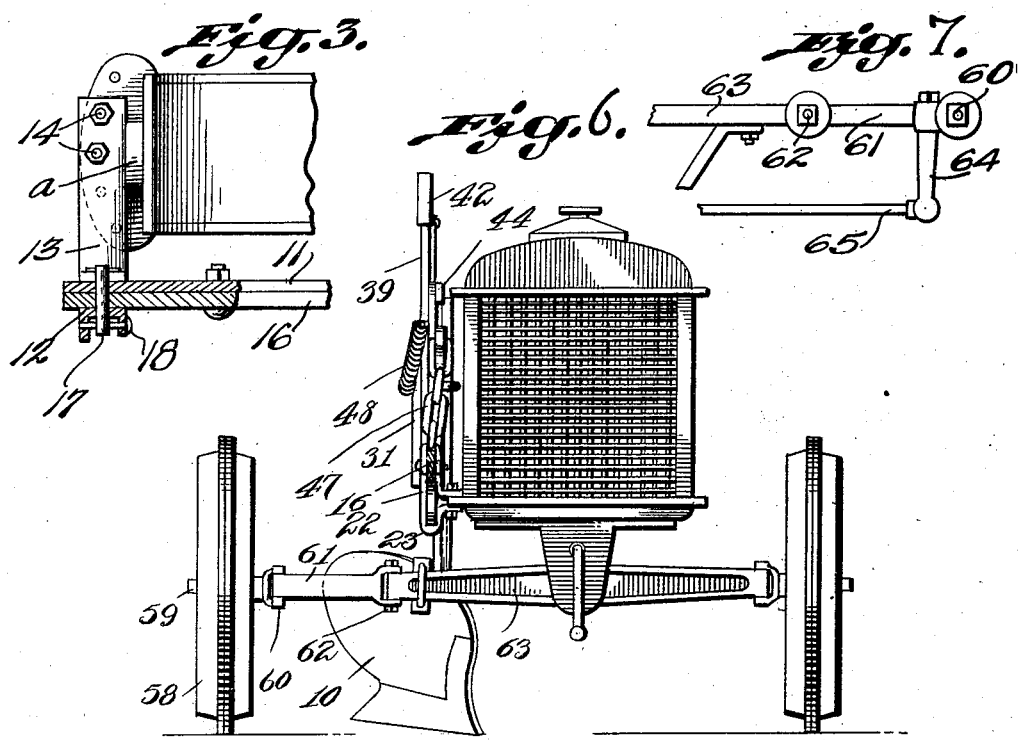
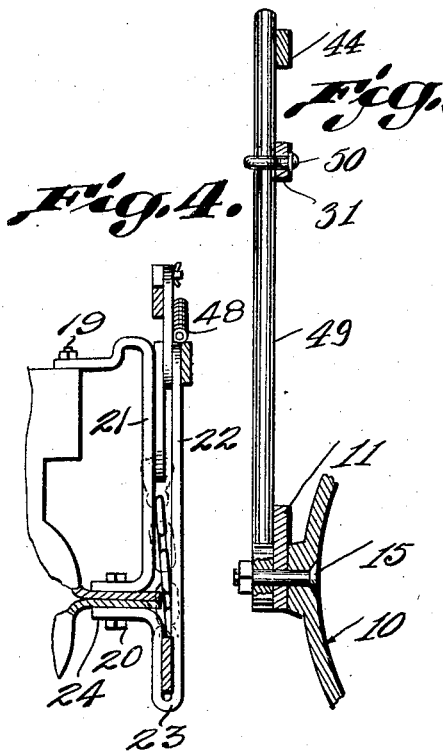
INVENTOR
Levi C. Hester
BY
Munn & Co.
ATTORNEY Patented Aug. 26, 1930

1,774,007

UNITED STATES PATENT OFFICE

LEVI C. HESTER, OF JACKSONVILLE, FLORIDA

AGRICULTURAL MACHINE

Application filed September 22, 1927. Serial No. 221,276.

This invention relates to improvements in agricultural machines generally, and more particularly to power driven types of such machines.

The principal object of the invention is to provide a plow attachment for tractors and the like, and one embodying extremely simplified and mechanically refined means for facilitating the attaching of plows, of either the disc blade or moldboard types thereof, in efficient operative position on known makes of tractors without seriously modifying the structure of the tractors for the purpose.

Another object of the invention is to provide for a plow structure as hereinbefore characterized, and one embodying a simple but highly efficient means for effectively controlling the depth of penetration of the shares or blades of either the moldboard or disc types thereof.

A further object of the invention is to provide for an efficient means of the class set forth and one which readily facilitates the raising and lowering of a plow share or unit from and to soil conditioning position of operation, and acts to hold the moldboard type of plow share in substantially level position at all times and throughout the range of adjustment of the same to and from normally raised position.

With the foregoing and other equally important objects in view, the invention resides in the certain new and useful combination, construction and arrangement of parts as will be hereinafter more fully described, set forth in the appended claims, and illustrated in the accompanying drawings, in which:

Figure 1 is a side elevation, partly in section, of a conventional form of tractor and showing a practical application of the preferred embodiment of the invention thereto, Figure 2 is a perspective view of the plow attachment per se, and showing the parts of the same as relatively positioned for assembly, Figure 3 is a fragmentary plan view, partly in section, of the hitch device extending between the plow attachment and the tractor, Figure 4 is a fragmentary top plan view, partly in section, of the rear end of the tractor and the plow attachment, and showing the manner of coupling the plow frame to the tractor frame or draw bar, Figure 5 is a vertical sectional detail through the plow attachment and showing the guide means for holding the plow share substantially level throughout its movements of adjustment to and from normally raised position, Figure 6 is a front elevation of the tractor and plow attachment as in Figure 1, and showing the manner of extending the front axle of the tractor at one side of the latter to provide proper clearance between the side of the tractor and the adjacent front steering wheel for the mounting of the plow attachment in position, and Figure 7 is a fragmentary top plan view of the extended portion of the front axle of the tractor, and showing the steering connection of the offset front steering wheel.

Referring to the drawings, wherein similar characters of reference designate corresponding parts throughout the several views thereof, and more particularly to Figures 1 to 5 inclusive, the preferred embodiment of the invention, as practically illustrated therein, comprises a plow share 10, which is mounted at the forward and downturned end of a member or bar 11. This member or bar 11 is substantially straight throughout its rearward length, and has its rearmost end engaged through an eye or loop 12 formed at the outer end of a hitch member or tail piece 13, which is detachably secured at its inner end, as by means of the bolts or screws 14, to the rear end portion of a tractor frame or, and preferably so, directly to the usual coupling member or draw bar $a$ at the rear end of the tractor. This hitch member or tail piece 13 is of a length to project to one side of the tractor and to dispose the eye or loop 12, at its outer end, in a plane passing vertically between the inner side of the right hand traction or ground wheel and the opposed side of the tractor frame, while the member or bar 11 extends forwardly from its point of engagement with the eye or loop 12 to dispose its forward end, and consequently the plow share 10 carried thereby, in a plane immediately in advance of the rear traction or ground wheel of the tractor. The plow share 10 is preferably supported from the member or bar 11 on pivot 15 which allows for the plow share bottom or mold-board 10' to adjust itself horizontally or perfectly flat in a manner to be hereinafter more fully explained.

Extending parallel to the right hand side of the tractor and substantially so with respect to the member or bar 11 is a main supporting member or beam 16, which has its rear end engaged in the eye or loop 12 at the outer end of the hitch member or tail piece 13 at the outer side of the member or bar 11. These rear end portions of the member or bar 11 and the member or beam 16 engaged within the eye or loop 12 are also engaged on a pivot member or pin 17 extending crossways through the eye or loop 12 with its outer end projecting through the outer wall of the latter. This projecting end of the pivot member or pin 17 is apertured to receive through the same a securing member or bolt 18, which is passed through aligned apertures formed in vertical flanges disposed at the opposite vertical side edges of the outer wall of the eye or loop 12, substantially as shown in Figure 3.

Secured on the right hand side of the forward part of the main housing or frame of the tractor, as by being bolted thereto, substantially as shown at 19, 20 in Figure 4, is a supporting and guide bracket for the main member or beam 16, which consists of an inner vertical member or bar 21 having its opposite end portions angularly bent inwardly for attached engagement with the tractor housing, and an outer vertical member or bar 22, which has its lower end portion bent to provide a vertically elongated loop portion 23, and the end portion of the inner leg of the loop angularly bent as at 24 and apertured to receive the securing bolt 20 commonly with the lower angularly bent end portion of the inner bracket or guide member or bar 21. The vertical portions of the members or bars 21 and 22 are arranged in spaced parallel relation to form between the same a slotway, which is closed at its lower end by the connected end portion of the looped portion 23 of the member or bar 22. The forward end of the main plow supporting member or beam 16 passes through the slotway aforesaid, and has its extreme forward end terminating in front of the forward end of the tractor housing frame. The looped end of the slotted guide bracket, thus provided, is supported in a plane above that of the hitch member or tail piece 13, so that the main plow supporting member or beam 16 is curvedly bent as at 16' to properly offset its forward end portion for engagement in the slotway of the guide member or bracket, as aforesaid. As indicated, as at 25, the plow share supporting member or bar 11 is bolted in a slightly downwardly offset relation to the main member or beam 16, whereby to have common vertical swinging movements on the pivot member or pin 17. The forward end of the main plow supporting member or beam 16 is curved slightly in an upward direction, and has secured to the same a bearing member or block 26, in which is vertically journalled a spindle 27, which is preferably formed to provide a crank portion 28 immediately below the bearing member or block 26. Secured on the free end of the crank portion 28 is an arm 29 in the outer end of which is journaled, as at 30', a ground disc or wheel 30. This disc or wheel 30 has rolling contact with the ground surface, when the plow share 10 is disposed in its operative position.

Disposed above the main supporting plow member or beam 16, and inclining in a forward direction is a stationary member or bar 31, which has its forward end bolted, as at 32, at the outer side of the upper end of the outer member or bar 22 of the guide bracket, and its rear end secured to an angle member or bracket 33, which, in turn, is secured, as by means of the bolt 34, to an adjacent portion of the rear end of the housing frame of the tractor. To facilitate the desired fastening of the rear end of the stationary member or bar 31 in position, this end of the same is formed to provide a substantially rectangular depending portion 31', which is bolted, as at 31'', to and at the outer side of a similar portion 35' of a rack segment 35 rising above the member or bar 31. These depending portions 31' and 35' are each provided with a pair of spaced aligning apertures to receive the free ends of the opposite leg portions of a U-bolt 36, which has its looped or closed end engaged over the upstanding portion of the angular member or bracket 33. The free ends of the U-bolt 36, after being passed through the aligned openings in the depending portions 31' and 35' are screw threaded to receive on the same the securing nuts 37. The lower portion of the rack segment 35, with which the depending portion 35' is formed, is further bolted, as at 38, to the stationary member or bar 31.

Associated with the rack segment 35 is a hand lever 39, which is pivoted at its lower end, as at 40, to the stationary member or bar 31. Mounted on the lever 39 is a boxing 41 in which is housed a latch or dog (not shown) normally disposed in cooperative engagement with the teeth of the rock segment 35. A hand grip 42 is pivoted at the grip end of the lever 39, and is operatively connected to the latch or dog aforesaid in a usual manner. Pivoted to the hand lever 39 upwardly from its lower pivoted end, as at 43, is the rearwardly disposed end of a bar or rod 44, which has its forward end pivotally connected, as at 45, to the free end of the upper arm of a bell crank lever 46. The bell crank lever 46 is pivotally mounted on the bolt 32 in the upper end of the supporting or guide bracket, and which is also employed to secure the forward end of the stationary member or bar 31 to the latter. The other and forwardly extending arm of the bell crank lever 46 has depending from the same a connector 47, which has its lower end attached to the forward end portion of the main plow supporting member or bar 16. This connector 47 may be of any suitable form, rigid or flexible, but is preferably in the form of a flexible member or chain, as shown. An expansion and contracting member, such as the coiled spring 48 is attached at one end to the upper arm of the bell crank lever 46, and has its other end attached to the stationary member or bar 31, and in a manner that its contracting effort always tends to sustain the bell crank lever 46 and its cooperative parts in their normally inoperative positions, in which positions, the forward end of the main plow supporting member or beam 31 is held suspended from the connector 47 in raised position with the plow share 10 lifted from soil conditioning operation.

Rigidly secured to the rear side of the plow share 10 and rising therefrom is a guide member or bar 49, which has its upper end portion bent or curved in a forward direction, as at 49', and engaged through the opening or eye of an eye bolt 50 adjustably secured in the stationary member or bar 31, the latter being provided with a plurality of spaced openings, whereby such adjustment can be readily accomplished, and which adjustment will be necessary only when different sizes or makes of plow shares are attached to the lower plow beam 11 and the guide bar 49. This guide member 49, and particularly its upper curved end portion 49', cooperates with the eye bolt 50 in a manner to hold the moldboard substantially level in any position of lowering and raising adjustment of the same to and from operative relation with the soil. As the plow point penetrates the soil, in the lowering movement of the main and lower supporting members or beams 11 and 16, the mold board will remain substantially level at any desired depth by the movement of the upper curved end portion 49', of the guide member or bar 49, in the eye bolt 50. This automatic self-adjustment of the plow share 10 obtains by reason of the relative movements of the parts of the structure during its raising and lowering movements.

To effect the mounting of the plow attachments, as thus constructed and arranged, on the tractor, the steering ground wheel 58 at the right hand side of the front end of the tractor is mounted on a spindle 59, which is pivoted, as at 60, to the outer end of an extension 61, which, in turn, is pivoted, as at 62, to the usual spindle receiving end of the front axle 63 of the tractor, from which the spindle 59 was previously detached. A steering arm 64 projects rearwardly from the spindle arm 59 in the usual manner, and has connected to the same an actuating rod 65, which leads to the usual steering control mechanism of the tractor.

In operation, the operator of the tractor from his seated position on the same will manipulate the hand lever 39 in a forward direction to lower the forward end of either of the plow supporting beams 16 or 16ª, as the case may be, when the weight of the latter and the attached plow share 10, or the disc plow blades 56, will cause the latter to penetrate the soil to be conditioned. By manipulating the hand lever 39, to various positions in a forward direction, the depth of penetration of the plow share 10, or the disc plow blades 56 will be correspondingly varied or regulated. However, if desired or necessary, as when attempting to condition exceedingly hard packed soil, a rigid link connection may be substituted for the flexible connection or chain 49, so that the forward movement of the hand lever 39 will forcibly depress the forward end of the plow beam 16, or the plow beam 16ª. In the use of the moldboard type of plow share 10, as the forward end of its supporting plow beam 16 is lowered, the point of the share will be directed downwardly to inclined soil penetrating position, and the plow share, in its entirety, will be swung on its pivot mounting 15 by the movement of the upper curved end portion of the guide member or rod 49 in the eye bolt 50, so as to assume a flat or horizontal position when the limit of its penetrating movement is reached, in which position it normally functions to properly condition the soil through which it is forced by the forward travel of the tractor. When the hand lever 39 is moved to its rearmost position with respect to the rack segment 35, the forward end of the plow beam 16, or the plow beam 16ª will be lifted and the plow share or blades withdrawn from soil conditioning position.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. The combination with a tractor, of a moldboard mounted for fore and aft rocking movement at one side of the tractor, vertical adjustable means carried by said tractor for varying the depth of penetration of the soil by said moldboard, and cooperative means carried by the tractor and said moldboard for holding the latter substantially level in any position of adjustment of the first named means.

2. The combination with a tractor, of a support mounted for vertical adjustment at one side of the tractor, a moldboard mounted for fore and aft rocking movement on said support, and cooperative means carried by the tractor and said moldboard for holding the latter substantially level in any position of adjustment of said support.

3. The combination with a tractor, of a beam pivotally mounted for vertical adjustment at one side of the tractor, a moldboard mounted for fore and aft rocking movement on said beam, and cooperative means carried by the tractor and said moldboard for holding the latter substantially level in any position of adjustment of said beam.

4. The combination with a tractor, of a beam pivotally mounted at one end at one side of the tractor, a moldboard mounted for fore and aft rocking movement on said beam, means for adjusting said beam vertically to vary the depth of penetration of the soil by said moldboard, and cooperative means carried by the tractor and said moldboard for holding the latter substantially level in any position of adjustment of said beam.

5. The combination with a tractor, of a beam supported at one side of the tractor, a moldboard carried by said beam and rockable in a longitudinal vertical plane relative thereto, means for adjusting said beam vertically to vary the depth of soil penetration of said moldboard, and cooperative means carried by the tractor and said moldboard for holding the latter substantially level in any position of the adjustment of the beam.

6. The combination with a tractor, of a beam pivotally supported at one side of the tractor, a moldboard carried by said beam and rockable in a longitudinal vertical plane relative thereto, means for adjusting said beam vertically to vary the depth of soil penetration of said moldboard, and cooperative means carried by the tractor and said moldboard for holding the latter substantially level in any position of the adjustment of the beam.

7. The combination with a tractor, of a beam pivoted at its rear end to an adjacent portion of the tractor, a moldboard carried by said beam and rockable in a longitudinal vertical plane relative thereto, means for adjusting said beam vertically to vary the depth of soil penetration of said moldboard, and cooperative means carried by the tractor and said moldboard for holding the latter substantially level in any position of the adjustment of the beam.

8. The combination with a tractor, of a beam pivoted at its rear end to an adjacent portion of the tractor at one side thereof, a moldboard carried by said beam and rockable in a longitudinal vertical plane relative thereto, means for adjusting said beam vertically to vary the depth of soil penetration of said moldboard, and cooperative means carried by the tractor and said moldboard for holding the latter substantially level in any position of the adjustment of the beam.

9. The combination with a tractor, of a beam pivoted at one end to the rear end of the tractor, a moldboard carried by said beam and rockable in a longitudinal vertical plane relative thereto, means for adjusting said beam vertically to vary the depth of soil penetration of said moldboard, means carried by the tractor for guiding the forward end of said beam and cooperative means carried by the tractor and said moldboard for holding the latter substantially level in any position of the adjustment of the beam.

10. The combination with a tractor, of a beam pivoted at one end to one side of the tractor, a moldboard pivotally mounted on said beam, a frame carried by the tractor, means carried by said frame for adjusting said beam vertically to vary the depth of soil penetration of said moldboard, means carried by said frame for guiding the forward end of said beam, and means carried by said frame and said moldboard for holding the latter substantially level in any position of adjustment of the beam.

11. The combination with a tractor, of a beam pivoted at one end to one side of the tractor, a moldboard pivotally mounted on said beam, a frame carried by the tractor, means carried by said frame for adjusting said beam vertically to vary the depth of soil penetration of said moldboard, means carried by said frame for guiding the forward end of said beam, a ground engaging support at the forward end of said beam, and means carried by said frame and said moldboard for holding the latter substantially level in any position of adjustment of the beam.

12. The combination with a tractor, of a beam pivoted at one end to one side of the tractor, a moldboard pivotally mounted on said beam, a frame carried by the tractor, means carried by said frame for adjusting said beam vertically to vary the depth of soil penetration of said moldboard, means carried by said frame for guiding the forward end of said beam, spring means for assisting said adjusting means in its movement to lift the said beam for the withdrawal of said moldboard from the soil, a ground engaging support at the forward end of said beam, and means carried by said frame and said moldboard for holding the latter substantially level in any position of adjustment of the beam.

13. The combination with a tractor, a moldboard pivotally supported for vertical movement at one side of the tractor, means carried by the tractor for adjusting said moldboard vertically to vary the depth of penetration of the soil thereby, a guide means carried by the tractor, and a member carried by said moldboard and cooperative with said guide means for holding the moldboard substantially level in any of its positions of adjustment.

14. The combination with a tractor, a moldboard pivotally supported for vertical movement at one side of the tractor, means carried by the tractor for adjusting said moldboard vertically to vary its depth of penetration of the soil thereby, an eye carried by the tractor, and a rod rising from said moldboard and having a bent portion engageable through said eye whereby the moldboard will be held substantially level in any of its positions of adjustment.

15. The combination with a tractor, a beam pivoted at one side of the tractor, a moldboard pivoted to said beam, means for adjusting said beam vertically of the tractor to vary the depth of soil penetration of said moldboard, a guide means carried by the tractor, and a member rising from said moldboard and engageable with said guide means for holding the moldboard substantially level in any of its positions of adjustment.

16. The combination with a tractor, a beam pivoted at one side of the tractor, a moldboard pivoted to said beam, a frame carried by the tractor above said beam, means carried by said frame for adjusting said beam vertically of the tractor to vary the depth of soil penetration of said moldboard, a guide member carried by said frame, and a member rising from said moldboard and engageable with said guide means for holding the moldboard substantially level in any of its positions of adjustment.

17. The combination with a tractor, a beam pivoted at one side of the tractor, a moldboard pivoted to said beam, a frame carried by the tractor above said beam, means carried by said frame for adjusting said beam vertically of said tractor to vary the depth of soil penetration of said moldboard, a guide member carried by said frame and adjustable relatively thereto, and a member rising from said moldboard and engageable with said guide means for holding the moldboard substantially level in any of its positions of adjustment.

LEVI C. HESTER.